Aug. 14, 1956 H. W. RICE ET AL 2,758,792
DETACHABLE PRESSURE EQUALIZING THERMOSTATIC MIXING VALVE
Filed April 7, 1955 3 Sheets-Sheet 1

INVENTORS
*Harold W. Rice and Charles M. Vaughn*
BY

THEIR ATTORNEY

Aug. 14, 1956 H. W. RICE ET AL 2,758,792
DETACHABLE PRESSURE EQUALIZING THERMOSTATIC MIXING VALVE
Filed April 7, 1955 3 Sheets-Sheet 3

INVENTORS
Harold W. Rice and Charles M. Vaughn
BY

THEIR ATTORNEY

2,758,792

DETACHABLE PRESSURE EQUALIZING THERMOSTATIC MIXING VALVE

Harold W. Rice and Charles M. Vaughn, Los Angeles, Calif., assignors to Robertshaw-Fulton Controls Company, Greensburg, Pa., a corporation of Delaware Application April 7, 1955, Serial No. 499,939

7 Claims. (Cl. 236—12)

This invention relates to mixing valves and, more particularly, to mixing valves for producing and delivering a liquid mixture of a predetermined temperature.

The primary object of the invention is to arrange the working parts of the valve control device in a manner to allow replacement of the entire control unit without disturbing plumbing or wall coverings.

Another object of the invention is to separate the inlet and outlet passageways of the valve housing of the control unit for easy replacement thereof.

Another object of the invention is to prevent the leakage of hot or cold fluid from the inlet and outlet sections of the valve housing while the control unit is removed therefrom.

To accomplish the above objects, the valve housing is preferably divided into two detachable sections, one of which houses the control valves and the other provided with suitable inlets, outlets and passageways for cooperation with the various chambers in the control unit section. Check valves are interposed between the inlets and outlets for insuring complete fluid stoppage in the event that the control unit is detached. The control valves and chambers are arranged in the control unit section of the housing so that there is no interference between the same and the elements of the inlet section.

Other objects and advantages will become apparent from the following specification taken in connection with the accompanying drawings wherein.

Figure 2:
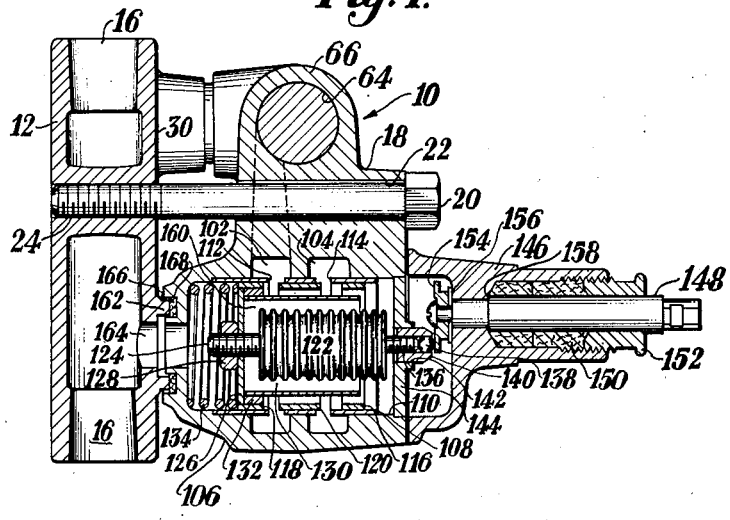
Fig. 2 is a section taken on the line II—II of Fig. 1.

Referring more particularly to the drawing, a mixing valve housing is shown as comprising a valve casing 10, and a manifold 12 having a pair of inlet openings 14, 15, a pair of outlet openings 16; the valve casing 10 being secured to the manifold 12 by a single screw 20. The screw 20 is slidably received in a bore 22 formed in the casing 18 and is threadedly secured in a tapped bore 24 in the manifold 12, as shown in Fig. 2.

Figure 3:
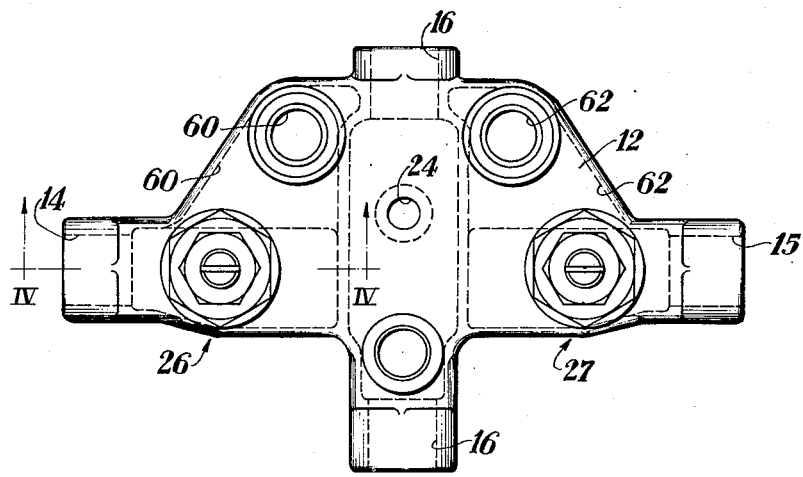
Fig. 3 is an elevation of a detail of the invention.
Figure 4:
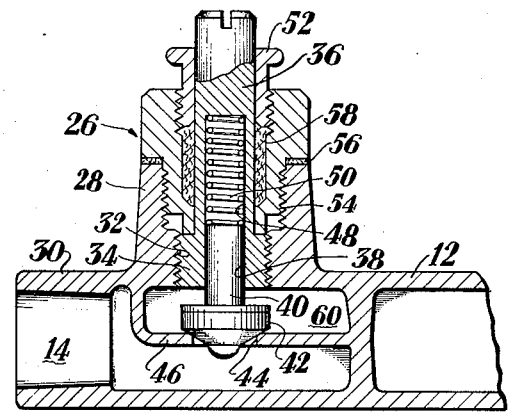
Fig. 4 is a section of a detail taken on the line IV—IV of Fig. 3.
Figure 5:
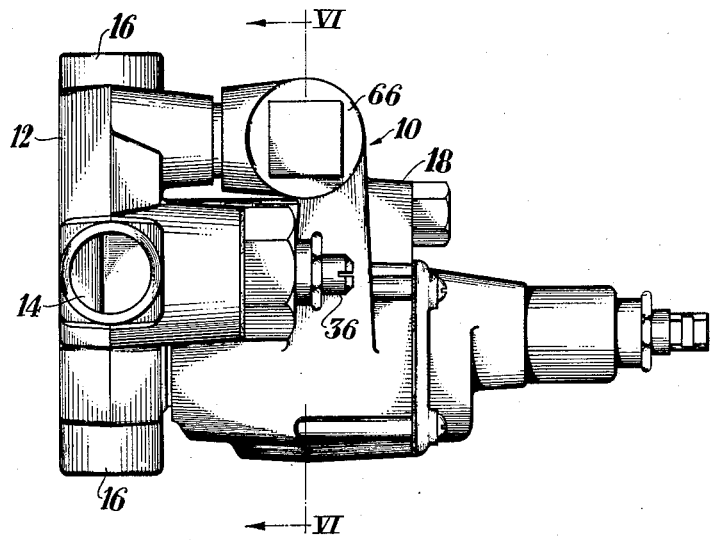
Fig. 5 is an elevation of the valve housing.

Referring now to Figs. 3 and 4, the manifold 12 is provided with a pair of stop check valves generally indicated by the reference numerals 26 and 27, each of which is located adjacent the inlet openings 14 and 15 respectively. The check valve 26 serves to manually control cold water flow from the inlet 14 to the valve casing 10 and the valve 27 performs the same function from inlet 15 with respect to hot water. Since the check valves 26 and 27 are of identical structure only one will be discussed in detail and for this, reference is made to Fig. 4.

A boss 28 projects laterally from a side wall 30 of the manifold 12 and is tapped at 32 to threadedly receive the plug section 34 of a manually operated shut-off screw 36. The plug section 34 has an opening 38 therein for slidably receiving a valve plunger 40 therethrough. One end of the plunger 40 terminates in a generally conical-shaped valve member 42 which is adapted to cooperate with a valve seat 44 formed in a wall 46 in the manifold 12. The other end of the plunger 40 is adapted to slide within a bore 48 formed in the screw 36 and is biased outwardly by a spring 50 held in compression between the rear wall of the bore 48 and the top surface of the plunger 40. The spring 50 serves to bias the valve member 42 to a closed position upon its seat 44. Leakage from the boss 28 is prevented by a bonnet 54 threaded into the boss 28, a conventional gasket 56 and a packing gland 58.

Figure 1:
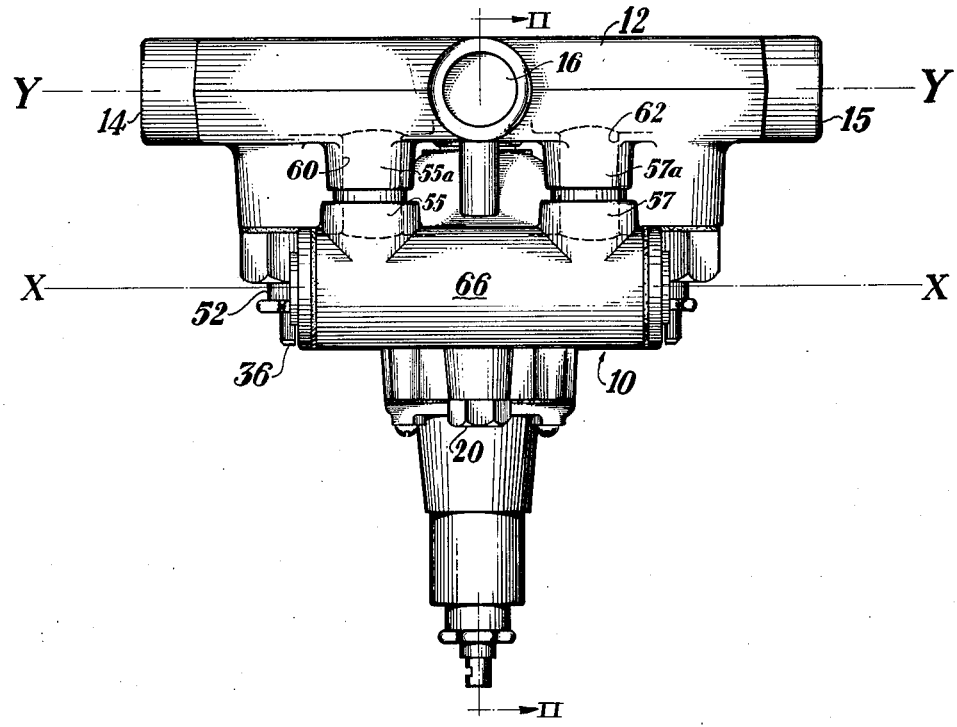
Fig. 1 is a plan view of a valve housing embodying this invention.

The wall 44 separates the inlet opening 14 from a cold inlet chamber 60, and with the manual shut-off screw 36 in the position shown in Fig. 4, the valve 42 constitutes a check valve in which cold water may flow from the inlet 14 through the valve seat 44 and into the inlet chamber 60, but may not flow in the reverse direction. If the valve casing 10 is to be detached from the manifold 12, the manual shut-off screw 36 is rotated inwardly to physically force the valve member 42 against its seat 44 thereby shutting off the flow of water into the chamber 60. As previously stated, the check valve 26 is identical with the check valve 27, and a hot inlet chamber 62 is similarly associated with the valve 27 as the cold inlet chamber 60 is to the valve 26. The casing 10 and the manifold 12 are each provided with a pair of interconnecting bosses 55, 57 and 55a, 57a, respectively. Any suitable leak-proof coupling may be employed between the juncture of the bosses 55, 55a and 57, 57a to prevent leakage of water when the casing 10 and the manifold 12 are joined, such for example, a resilient bushing interposed between the abutting portions of the bosses. As shown in Fig. 1, the cold inlet chamber 60 is formed in the bosses 55, 55a and the hot inlet chamber 62 is formed in the bosses 57, 57a, and these chambers have their axes in parallel.

Figure 6:
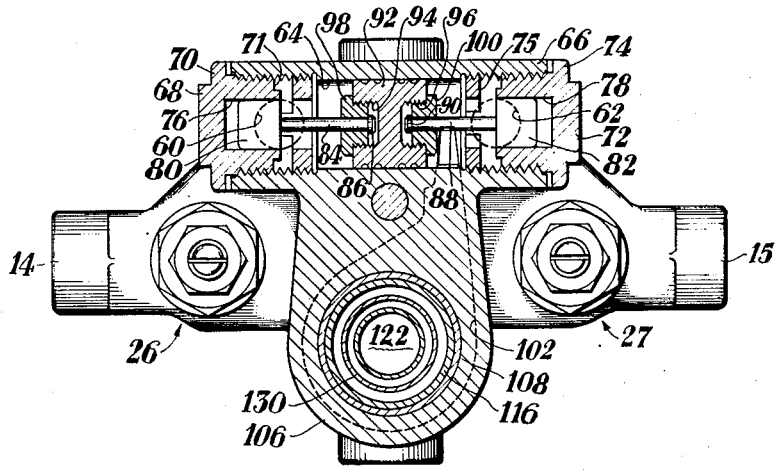
Fig. 6 is a section taken on line VI—VI of Fig. 5.

Referring now to Figs. 3 and 6, the inlet chambers 60 and 62 communicate with a pressure equalizing chamber 64 formed in a housing 66 which is constructed as an integral portion of the valve casing 10. It is to be noted that the axes X—X of the housing 66 and consequently the chamber 64 are parallel with the axes Y—Y passing through the inlets 14 and 15, as shown in Fig. 1.

The chamber 64 is closed at one end by a threaded cap 68 having a shoulder 70 which is adaped to seat upon one end of the housing 66 and a peripheral groove 71 communicating with the cold inlet chamber 60. A similar cap 72 closes the other end of the chamber 64 and is provided with a shoulder 74 for engagement with the end of the housing 66 and a peripheral groove 75 communicating with the hot inlet chamber 62. Both caps 68 and 72 are suitably bored at 76, 78 for slidably receiving valve pistons 80, 82, respectively. A stem 84 projects from the valve piston 80 into the chamber 64 and terminates in a small head 86. The valve piston 82 is similarly provided with a stem 88 having a small head 90 at the end opposite the piston 82.

In the central portion of the chamber 64, there is mounted for reciprocation, a pressure sensitive piston 92 having threaded internal bores 94, 96 for receiving a pair of nuts 98, 100, respectively. The nut 98 is centrally bored to slidably receive the stem 84 and abut the head 86 for moving the stem 84 and the piston 80 during reciprocation of the piston 92. The stem 88 and piston 82 are likewise held for reciprocatory movement with the piston 92 by the abutment of the head 90 against the inner end of the nut 100. Actually, a small clearance is provided between the ends of the heads 86 and 90 with the inner walls of the bore 94 and 96, respectively, to allow a short longitudinal displacement of the two pistons 80, 82, thereby allowing a maximum of misalignment of the axes of the latter without impairing the operation thereof.

From Fig. 6, it will be apparent that the piston valves 80 and 82 are operable in the caps 68 and 72 to regulate the size of the grooves 71 and 75, respectively. The relative pressures of the hot and cold water entering the equalizing chamber 64 are automatically regulated in the following manner.

It is assumed that the pressure of the cold water supply entering the chamber 64 from the cold inlet chamber 60 drops below the pressure of the hot water entering the chamber 64 from the hot inlet chamber 62. The greater pressure of the hot water on the right side of the piston 92, as viewed in Fig. 6, will move the same to the left, thereby causing the piston valve 82 to partially close the groove 75 and consequently diminish the inflow of hot water and the pressure thereof in the chamber 64. A similar effect is produced in the event the hot water pressure is reduced, with the overall effect of maintaining equal pressure of the hot and cold water within the chamber 64.

From the pressure equalizing chamber 64, the hot water is permitted to flow in a mixing chamber, to be described hereinafter, by way of a passage 102, as shown in Fig. 2 while the cold water is permitted to flow through a mixing chamber through a passage 104, as shown in Figs. 2 and 6.

In the lower portion of the valve casing 10, there is integrally mounted a thermostat housing 106 having a sleeve 108 secured to an interior wall 110 thereof. The sleeve 108 is provided with slotted ports 112 and 114 for cooperation with the hot and cold inlet passages 102, 104, respectively. A reciprocatory, tubular sleeve valve member 116 is disposed within the sleeve 108 and is provided with ports 118 and 120 adapted to register with the ports 112 and 114, respectively, for a purpose to be described hereinafter.

Located centrally in the interior of the housing 106 and within the sleeve valve member 116 is a thermostatic element 122 of the expansible bellows type which is filled with an expansible liquid whereby the bellows are expanded upon a rise in temperature. The left end of the element 122, as viewed in Fig. 2, terminates in a threaded stud 124 which is fastened to a perforated plate 126 by means of a central threaded hole located therein and is locked in position by a lock nut 128. The outer periphery of the plate 126 is fastened rigidly to one end of the sleeve valve member 116, a baffle cylinder 130 and a centralizing bushing 132. An expansion spring 134 is interposed and held in compression between one end wall of the interior of the housing 106 and the valve member 116.

The other end of the element 122 also terminates in a threaded stud 136 which is in contact with a bearing ball 138 held by a retaining nut 140 on the stud 136. This nut 140 is guided in a central opening 142 of a plate 144 secured in the housing 106. Covering the plate 144 and extending outwardly from the housing 106, is an elongated hollow boss 146, in which is rotatably mounted the stem 148 of a temperature regulating device. Leakage along the stem 148 is prevented by a packing 150 around the stem 148 which is compressed by a gland 152 threaded into the boss 146.

The inner end of the stem 148 is provided with a face cam 154 secured to the stem 148 by any suitable means which holds the cam 154 from rotation with respect to the stem 148. A thrust washer 156 prevents the stem 148 from moving to the right and a shoulder 158 on the stem 148 prevents the shaft from moving to the left. It will be obvious that a suitable knob may be employed on the stem 148 with a suitable indicator for regulating the position of the cam 154, and thereby the thermostatic element. As previously stated, the element 122 and valve member 116 are biased to the right by the action of the spring 134, and this bias forces the ball 138 in continuous contact with the cam 154.

With the slots 112, 114 and 118, 120 in the position shown in Fig. 2, the passages 102 and 104 are in communication with a mixing chamber 160 in which the thermostatic element 122 is free to expand and contract. The side wall 30 of the manifold 12 is provided with an annular boss 162 concentric with a port 164 formed in the wall 30. The port 164 serves as a connecting passageway for mixed hot and cold water flowing from the housing chamber 160 into the outlet 16. An annular groove 166 formed in the housing 106 is provided with a suitable washer 168 for contacting the outer surface of the boss 162 when the valve casing 10 and the manifold 12 are joined, as shown in Fig. 2. It will be apparent that with the parts in this position, leakage around the boss 162 is prevented, and in the event that the valve casing 10 and manifold 12 are separated, the boss 162 is easily detached from its position in the groove 168.

*Operation*

Assuming that the inlets 14 and 15 are connected to sources of cold and hot water respectively and a mixture at a predetermined temperature is desired, the stem 148 is manipulated to a position indicative of the desired temperature. This manipulation moves the thermostatic element 122 to the left against the bias of the spring 134 and since the element 122 carries the valve member 116, the ports 112, and 114 are open by the movement of the valve member 116. Normally the slots 112 and 114 will each be about one half open when the stem 148 is in the "medium" position, between the "hot" and "cold" positions.

The hot water enters the manifold 12 through the inlet 15, past the check valve 27 and through the inlet chamber 62, the peripheral groove 75, through the space between the shaft 88 and the bore 78, and into the pressure equalizing chamber 64. From the chamber 64, the hot water flows through the passage 102, slots 112 and 118 into the mixing chamber 160. The cold water enters the manifold 12 through the inlet 14, past the check valve 26 and through the inlet chamber 60, the peripheral groove 71, through the space between the shaft 84 and the bore 76 and into the pressure equalizing chamber 64. From there, the cold water will flow through the passage 104, slots 114 and 120, into the mixing chamber 160.

Mixture of the hot and cold water will flow around the thermostatic element 122 where it will be in thermal relation therewith and flow through the port 164 into the outlet 16. If the temperature of the resulting mixture in the chamber 160 is higher than that for which the thermostatic element 122 is set, the same will expand to thereby move the valve member 116 to the left, as viewed in Fig. 2, thereby further opening the slot 114 and further closing the slot 112.

Variation in temperature of the mixture will be automatically compensated for in this manner so that the resulting mixture will always be delivered at the desired temperature for which the valve member 116 is set. Should a colder mixture be desired, the stem 148 will be rotated so that the ball 138 will engage the higher portion of the cam 154, thereby moving the thermostatic element 122 and the valve member 116 slightly to the left to increase the cold water flow from passage 104 and decrease the hot water flow from the passage 102.

It will be apparent from the foregoing that the invention embodies a number of features described as a mixing valve. For instance, all of the working parts of the mixing valve are contained in the valve casing while all pipe connections for the inlet and outlets are contained in a separate manifold. Should it be required to service or replace the working parts, it is only necessary to manipulate the shut-off screws 26 and 27 to close off all flow of water into the valve casing 10 and to remove the single bolt 20 to separate the valve casing 10 and the manifold 12. The various working parts in the valve casing 10 may be serviced or replaced without the usual necessity of shutting off all water supply within a building employing such a mixing valve.

While we have chosen to illustrate and describe certain preferred embodiments of our invention, it will be understood that these are by way of example only and are not to be considered as limiting beyond the scope of the appended claims.

We claim:

1. A mixing valve for fluids comprising, in combination, a manifold provided with a pair of inlets and a pair of outlets, a plurality of hollow bosses carried by said manifold, a stop-check valve in each of said inlets and operable for shutting off flow of fluid therein, a casing having a pressure equalizing chamber and a mixing chamber formed therein, means in said pressure equalizing chamber for equalizing the pressure of fluids discharged therefrom, thereromostatic means in said mixing chamber for controlling the admission of fluid to said mixing chamber, a plurality of hollow bosses carried by said casing and adapted to register with said hollow bosses extending from said manifold to provide fluid passageways between said casing and manifold, and fastening means extending between said manifold and casing and spaced from all of said inlets, outlets, chambers and passageways therein for operatively connecting said manifold and casing whereby said casing containing said pressure equalizing means and said thermostatic means can be removed as a unit from said manifold upon operation of said stop-check valves and detachment of said fastening means.

2. A mixing valve for fluids comprising, in combination, a manifold having a pair of inlets and a pair of outlets, a plurality of hollow bosses carried by said manifold, a pair of inlet chambers in said manifold connecting said pair of inlets and two of said hollow bosses, a spring-biased, manually adjustable stop-check valve positioned in said manifold between each of said inlets and said inlet chambers and operable for shutting off flow of fluid therein, a casing having a pressure equalizing chamber and a mixing chamber formed therein, means in said pressure equalizing chamber to equalize the pressure of fluids discharged therefrom, a spring-biased sleeve valve in said mixing chamber, thermostatic control means operatively connected to said sleeve valve to control the admission of fluids to said mixing chamber, a plurality of hollow bosses carried by said casing and adapted to register with said hollow bosses on said manifold to provided fluid connections between said manifold and casing, and fastening means extending between said manifold and casing and spaced from all of said inlets, outlets, chambers and fluid connections for operatively connecting said manifold and casing whereby said casing containing said pressure equalizing means and said thermostatic means can be removed as a unit from said manifold upon operation of said stop-check valves and detachment of said fastening means from said manifold.

3. A mixing valve for fluids comprising, in combination, a manifold, a hot fluid inlet and a cold fluid inlet in said manifold, a pair of mixed-fluid outlets in said manifold, a pair of hollow bosses carried by said manifold, chambers within said manifold connecting said hot and cold inlets and said pair of hollow bosses, a spring-biased, manually operable stop-check valve positioned between each of said inlets and said inlet chambers and operable for shutting off flow of fluid therein, a third hollow boss carried by said manifold and communicating with said mixed-fluid outlets, a casing having a pressure equalizing chamber and a mixing chamber formed therein, a pair of piston valves in said pressure equalizing chamber, means operatively interconnecting said piston valves with a piston movable in opposite direction in response to changes in fluid pressures within said pressure equalizing chamber, a sleeve valve movable within said mixing chamber, means biasing said sleeve valve in one direction of movement, a thermostatic element operatively connected to said sleeve valve to regulate the flow of fluids entering said mixing chamber, a hollow boss carried by said casing communicating with said mixing chamber and adapted to register with said third boss carried by said manifold to connect said mixing chamber with said pair of mixed-fluid outlets in said manifold, a pair of hollow bosses carried by said casing and adapted to register with said pair of bosses carried by said manifold to provide closed fluid passageways between said inlets in said manifold and said pressure equalizing chamber in said casing, and a bolt extending between said manifold and casing and spaced from all of said inlets, outlets, chambers and passageways for operatively connecting said manifold and casing whereby said casing containing said pressure equalizing means and said thermostatic means may be removed as a unit from said manifold upon operation of said stop-check valves and removal of said bolt from said manifold.

4. In a mixing valve for mixing hot and cold fluids, the combination comprising a manifold having a pair of inlets and a pair of mixed-fluid outlets, a pair of hollow bosses carried by said manifold, inlet chambers connecting said hollow bosses and said inlets, a third hollow boss carried by said manifold and communicating with said mixed-fluid outlets, a spring-biased manually operable stop-check valve positioned in said manifold between each of said inlet chambers and said inlets and operable for shutting off flow of fluid therebetween, a casing having a pressure equalizing chamber and a mixing chamber formed therein, means in said pressure equalizing chamber to equalize the pressures of fluids discharged therefrom, a thermostatic element in said mixing chamber to control the admission of fluids to said mixing chamber, a pair of hollow bosses carried by said casing and adapted to register with said pair of bosses carried by said manifold to provide fluid passageways between said pressure equalizing chamber and said manifold inlets, a third hollow boss carried by said casing and adapted to register with said third boss carried by said manifold to provide a fluid passageway between said mixing chamber and said mixed-fluid outlets in said manifold, and a bolt extending between said manifold and casing and spaced from all of said inlets, outlets, chambers and passageways for operatively connecting said manifold and casing for passage of fluids therebetween, the operation of said stop-check valves and the detachment of said bolt from said manifold permitting said casing containing said pressure equalizing means and said thermostatic means to be removed as a unit from said manifold without further flow of fluids from said manifold.

5. In a mixing valve for mixing hot and cold fluids, the combination comprising a manifold, a pair of inlets and a pair of mixed-fluid outlets in said manifold, a pair of hollow bosses carried by said manifold, inlet chambers in said manifold connecting said hollow bosses and said inlets, a third hollow boss carried by said manifold and communicating with said mixed-fluid outlets, spring-biased, manually operable check-valves positioned in said manifold between said inlets and said inlet chambers and operable for shutting off the flow of fluid therein, a casing cooperable with said manifold, a pressure equalizing chamber in said casing, means in said pressure equalizing chamber to equalize the pressures of fluids discharged therefrom, a pair of bosses carried by said casing and adapted to register with said pair of bosses carried by said manifold to provide fluid passageways between said inlets in said manifold and said pressure equalizing chamber, a mixing chamber formed in said casing, a reciprocable sleeve valve in said mixing chamber, means biasing said sleeve valve in one direction, a thermostatic element operatively connected to said sleeve valve to regulate the flow of fluids entering said mixing chamber, a third hollow boss carried by said casing and adapted to register with said third hollow boss carried by said manifold to provide a passageway for fluid between said mixing chamber and said mixed-fluid outlets in said manifold, and a bolt extending between said manifold and casing and spaced from all of said inlets, outlets, chambers and passageways for operatively connecting said manifold and casing for passage of fluids therebetween, said bolt having one end seated on the exterior surface of said casing whereby said casing containing said pressure equalizing means and said thermostatic means may be removed as a unit from said manifold upon operation of said stop-check valves and detachment of said bolt from said manifold.

6. In a mixing valve for mixing hot and cold fluids, the combination comprising a manifold, a hot fluid inlet and a cold fluid inlet in said manifold, a pair of mixed-fluid outlets in said manifold, a pair of hollow bosses carried by said manifold, inlet chambers in said manifold connecting one of said bosses with said hot fluid inlet and connecting the other of said bosses with said cold fluid inlet, a stop-check valve positioned between each of said inlet chambers and each of said inlets and operable for shutting off flow of fluid therebetween, a third hollow boss carried by said manifold and communicating with said mixed fluid outlets, a casing cooperable with said manifold, a pressure equalizing chamber in said casing, a pair of piston valves in said equalizing chamber, a centrally-disposed piston in said pressure equalizing chamber operatively connecting and co-ordinating the movement of said piston valves, said centrally-disposed piston being operable to change the position of said slidable piston valves in response to a change in fluid pressures within said pressure equalizing chamber, a pair of hollow bosses carried by said casing and adapted to register with said pair of hollow bosses carried by said manifold to provide two fluid passageways between said manifold and said pressure equalizing chamber, a mixing chamber within said casing, a pair of passageways in said casing connecting said pressure equalizing chamber and said mixing chamber, a reciprocable sleeve valve within said mixing chamber, means biasing said sleeve valve in one direction, a thermostatic element operatively connected to said sleeve valve to control the admission of fluids into said mixing chamber, a third hollow boss carried by said casing and adapted to register with said third boss carried by said manifold to provide an outlet for said mixing chamber, means to shift the position of said thermostatic element in said mixing chamber to vary the proportions of said fluids admitted to said mixing chamber, and a bolt extending between said manifold and casing and spaced from all of said inlets, outlets, chambers and passageways for operatively connecting said manifold and casing for passage of fluids therebetween, the disconnection of said bolt from said manifold and the manual closing of said stop-check valves permitting said casing containing said pressure equalizing means and said thermostatic means to be removed as a unit from said manifold without flow of fluids from said manifold.

7. A mixing valve for fluids comprising, in combination, a manifold, a hot fluid inlet and a cold fluid inlet in said manifold, a pair of mixed-fluid outlets in said manifold, a pair of hollow bosses carried by said manifold, one inlet chamber in said manifold connecting said hot fluid inlet with one of said bosses and another inlet chamber in said manifold connecting said cold fluid inlet with another of said bosses, a spring-biased manually adjustable stop-check valve positioned between each of said inlets and each of said inlet chambers and operable for shutting off the flow of fluid therebetween, a third boss carried by said manifold and communicating with said pair of mixed fluid outlets, each of said bosses positioned approximately at the apex of a substantially equilateral triangle, a casing provided with a pressure equalizing chamber therein, means in said pressure equalizing chamber to valve the flow of hot and cold fluid into said chamber in response to changes in the pressures of said hot and cold fluids entering said chamber, a pair of hollow bosses carried by said casing and communicating with said pressure equalization chamber, a mixing chamber in said casing, a slotted sleeve within said mixing chamber and fixed against movement therein, a sleeve valve reciprocable within said slotted sleeve, means biasing said sleeve valve in one direction, a thermostatic element operatively connected to said sleeve valve to control the admission of fluid into said mixing chamber, a third hollow boss carried by said casing and adapted to register with said third hollow boss carried by said manifold to provide a discharge passageway extending from said mixing chamber into said manifold, manually adjustable means to adjust the axial position of said thermostatic element to control the proportionate mixture of fluids entering said mixing chamber, and a bolt extending between said manifold and casing at the approximate median center of said substantially equilateral triangle and spaced from all of said inlets, outlets, chambers and passageways for operatively connecting said manifold and casing, said stop-check valves and said bolt accessible for positioning from the exterior of said manifold and casing whereby said casing containing said pressure equalizing means and said thermostatic means can be removed as a unit from said manifold upon closing of said stop-check valves and removal of said bolt from said manifold.

References Cited in the file of this patent
UNITED STATES PATENTS

| | | |
|---|---|---|
| 1,948,971 | Meyer | Feb. 27, 1934 |
| 2,016,460 | Sorensen | Oct. 8, 1935 |
| 2,200,578 | Mahon | May 14, 1940 |
| 2,207,681 | Hibner et al. | July 9, 1940 |
| 2,250,815 | Ruegg et al. | July 29, 1941 |
| 2,566,019 | Dempsey | Aug. 28, 1951 |